(12) United States Patent
Ricketts et al.

(10) Patent No.: US 12,317,780 B2
(45) Date of Patent: Jun. 3, 2025

(54) BRUSH SYSTEM FOR A THRESHING AND SEPARATING SYSTEM OF AN AGRICULTURAL HARVESTER

(71) Applicant: CNH Industrial America LLC, New Holland, PA (US)

(72) Inventors: Jonathan E. Ricketts, Davenport, IA (US); Craig E. Murray, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 677 days.

(21) Appl. No.: 17/591,036

(22) Filed: Feb. 2, 2022

(65) Prior Publication Data

US 2023/0240190 A1 Aug. 3, 2023

(51) Int. Cl.
*A01F 12/22* (2006.01)
*A01F 12/44* (2006.01)

(52) U.S. Cl.
CPC ............ *A01F 12/22* (2013.01); *A01F 12/442* (2013.01)

(58) Field of Classification Search
CPC ... A01F 12/00–12/60; A01F 7/00–7/70; A01F 11/00–11/08; A01D 41/00–41/16
See application file for complete search history.

(56) References Cited

U.S. PATENT DOCUMENTS

| | | | | |
|---|---|---|---|---|
| 1,859,138 A | * | 5/1932 | Haba | A01F 12/22 460/109 |
| 2,133,451 A | * | 10/1938 | Heinlein | A01F 12/20 460/71 |
| 2,974,668 A | * | 3/1961 | Witzel | A01F 7/06 99/626 |
| 3,426,760 A | * | 2/1969 | Necas | A01F 12/22 460/71 |
| 4,499,712 A | | 2/1985 | Klinner | |
| 4,611,605 A | * | 9/1986 | Hall | A01F 12/442 460/80 |
| 10,178,832 B2 | | 1/2019 | Fink | |
| 2008/0274778 A1 | * | 11/2008 | Eyre | A01F 12/44 460/119 |
| 2020/0205342 A1 | | 7/2020 | Robertson | |
| 2023/0247943 A1 | * | 8/2023 | Mitsui | A01F 12/26 460/16 |
| 2024/0268271 A1 | * | 8/2024 | Mitsui | A01F 12/44 |

FOREIGN PATENT DOCUMENTS

| | | |
|---|---|---|
| CN | 205213479 U | 5/2016 |
| CN | 205510967 U | 8/2016 |
| CN | 210298566 U | 4/2020 |
| WO | 2014/076450 A1 | 5/2014 |

* cited by examiner

*Primary Examiner* — Adam J Behrens
*Assistant Examiner* — Madeline I Runco
(74) *Attorney, Agent, or Firm* — Peter K. Zacharias; Rebecca L. Henkel; Rickard K. DeMille (57) ABSTRACT

An agricultural harvester includes: a chassis; and a threshing and separating system coupled with the chassis, the threshing and separating system including a rotor including at least one brush device including a plurality of fingers which are flexible, the plurality of fingers being configured for engaging a crop material.

15 Claims, 7 Drawing Sheets

BRUSH SYSTEM FOR A THRESHING AND SEPARATING SYSTEM OF AN AGRICULTURAL HARVESTER

FIELD OF THE INVENTION

The present invention pertains to an agricultural harvester, and, more specifically, to a rotor of a threshing and separating system of the agricultural harvester.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

The rotary threshing and separating system has not been able to produce straw (i.e., material other than grain (MOG)) with a length that is equal to that of a conventional cylinder machine but is, instead, shorter. In such a rotary system, the crop material can pass a concave and separator section two and one-half to three times, whereas a conventional system passes only once. This extra passing subjects the MOG to a harsher handling, thus decreasing the length of the MOG.

Other industries employ brushes to move material. For example, the street sweeping and construction industries employ brushes to move heavy masses of material. For instance, in the construction industry, such brushes are used to move masses of dirt, asphalt, and so on. Similarly, the vacuum cleaner also employs brushes to move material. In one or more of these industries, various brush patterns are employed.

What is needed in the art is a rotor of a rotary threshing and separating system which enables MOG to be longer after passing through this system.

SUMMARY OF THE INVENTION

The present invention provides a rotor of a threshing and separating system which includes brushes for engaging the crop material.

The invention in one form is directed to a threshing and separating system of an agricultural harvester coupled with a chassis of the agricultural harvester, the threshing and separating system including: a rotor including at least one brush device including a plurality of fingers which are flexible, the plurality of fingers being configured for engaging a crop material.

The invention in another form is directed to an agricultural harvester includes: a chassis; and a threshing and separating system coupled with the chassis, the threshing and separating system including a rotor including at least one brush device including a plurality of fingers which are flexible, the plurality of fingers being configured for engaging a crop material.

The invention in yet another form is directed to a method of using an agricultural harvester, the method including the steps of: providing that agricultural harvester includes: a chassis; and a threshing and separating system coupled with the chassis, the threshing and separating system including a rotor including at least one brush device including a plurality of fingers which are flexible; and engaging a crop material by the plurality of fingers.

An advantage of the present invention is that it provides a way to engage the crop material in a threshing and separating system in a less harsh manner, thereby producing MOG which is longer in length and thus less broken up.

Another advantage of the present invention is that it provides a simple and effective way to attach and thereby retain the brushes to the rotor of the threshing and separating system.

Yet another advantage of the present invention is that an existing rotor can be used, replacing some of the rasp bars/separator bars with brush devices of the present invention.

Yet another advantage of the present invention is that it provides a way to change the pattern of the brushes of the rotor in a straightforward manner.

Yet another advantage of the present invention is that it provides that the brushes can replace at least some of the rasp bars (which can also be called separation bars), these brushes being lighter in weight than the rasp bars, which can advantageously reduces the horsepower needed to operate the rotor, and also enables manufacturing to be less expensive.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
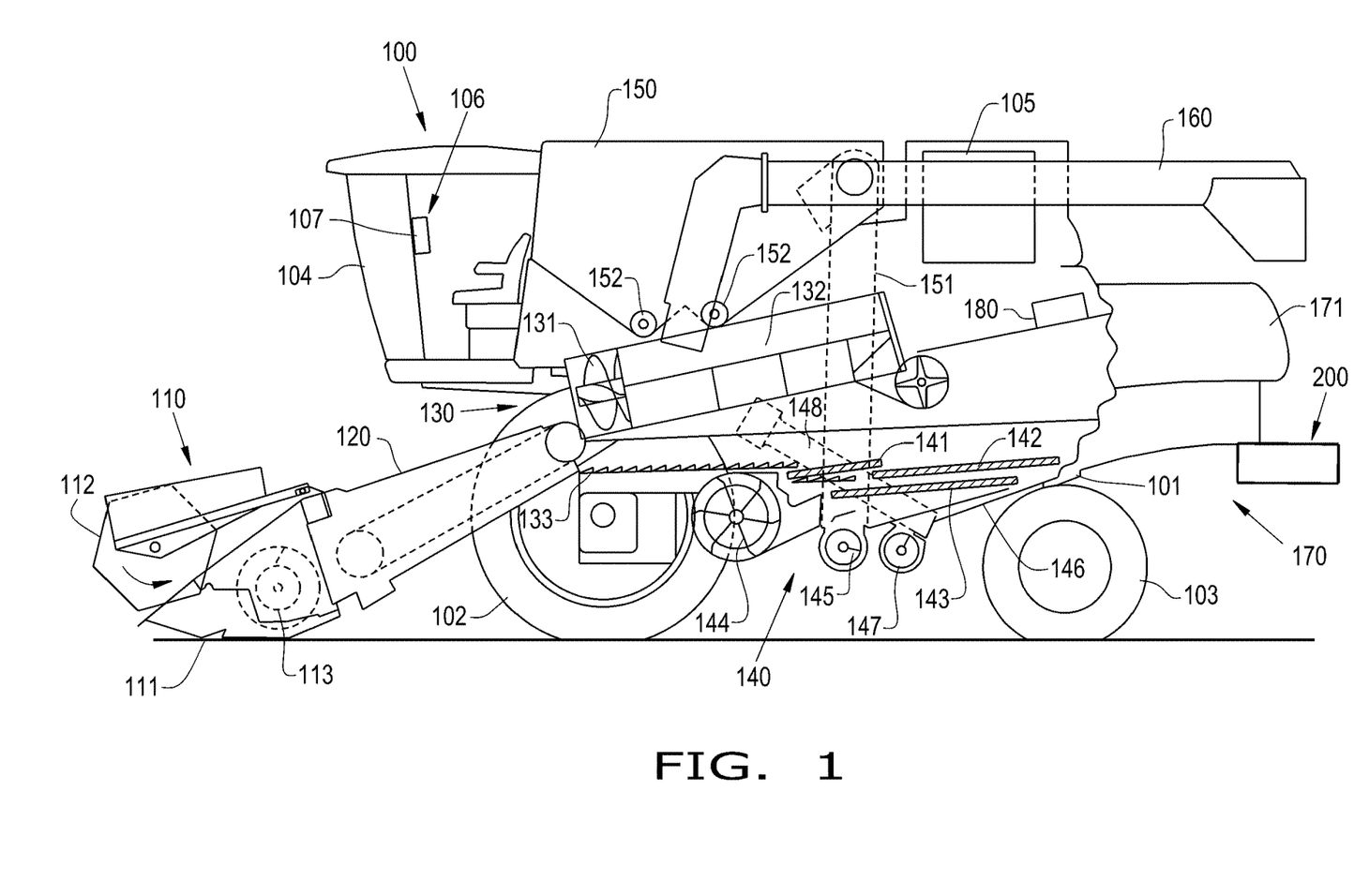
FIG. 1 illustrates a side view of an exemplary embodiment of an agricultural harvester, the agricultural harvester comprising a threshing and separating system with a rotor, in accordance with an exemplary embodiment of the present invention.

Referring now to the drawings, and more particularly to FIG. 1, there is shown schematically an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing and separating rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc. Because combine 100 is shown schematically, threshing and separating system 130 is deemed to be generic to all embodiments of the threshing and separating system of the present invention shown herein.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
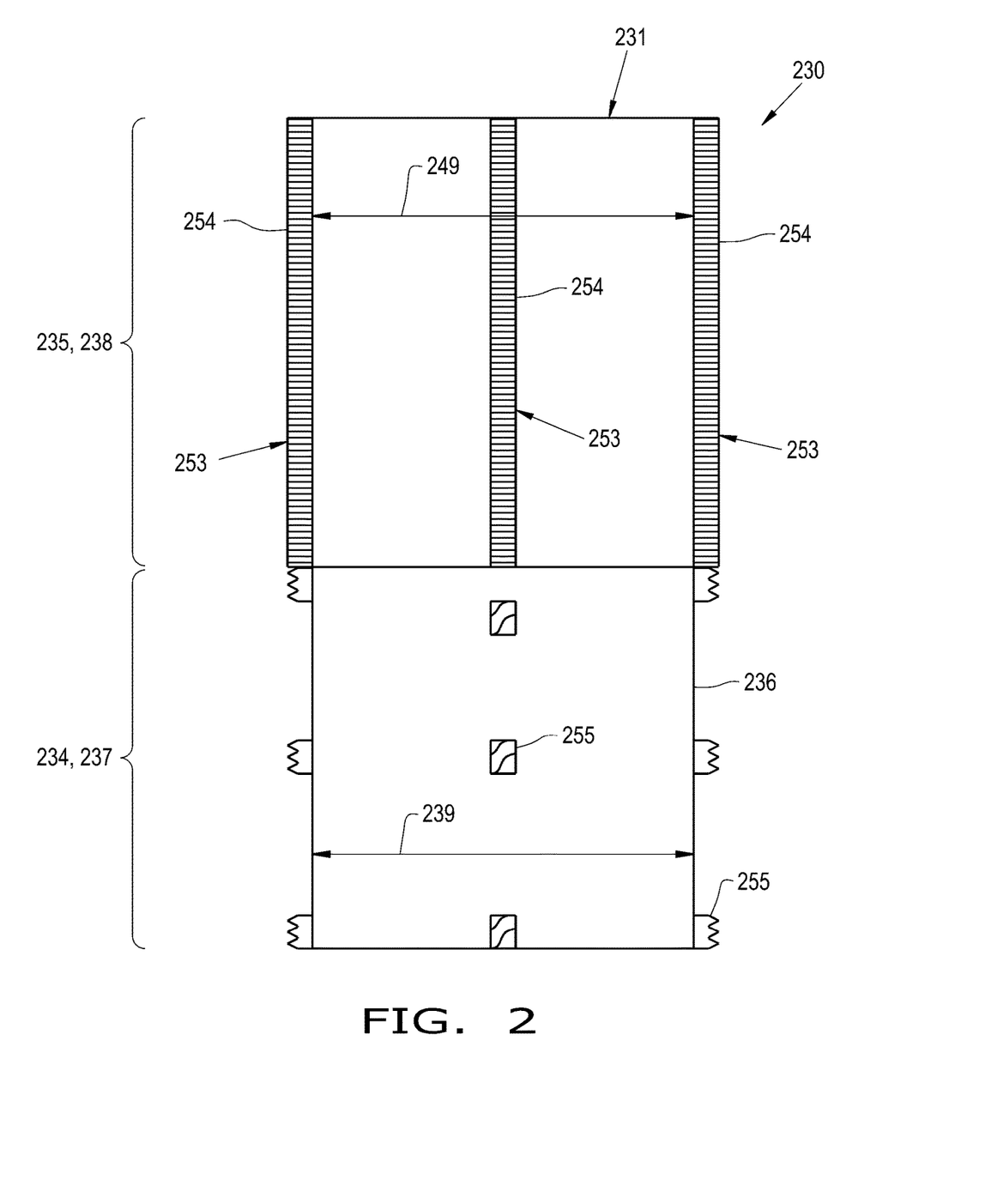
FIG. 2 illustrates a top view of the threshing and separating system of the agricultural harvester of FIG. 1, with portions broken away, the threshing and separating system including an exemplary embodiment of the rotor, in accordance with an exemplary embodiment of the present invention.

Referring now to FIG. 2, there is shown a top view of an embodiment of the threshing and separating system 130 of FIG. 1, with portions broken away, according to an exemplary embodiment of the present invention. All prior reference numbers with respect to threshing and separating system 130 are increased by a multiple of 100 and are substantially similar to the structures and function of the embodiment shown in FIG. 1, unless otherwise shown and/or described. Thus, threshing and separating system 130 is labeled as 230 in FIG. 2. Threshing and separating system 230 is coupled with chassis 101 and includes a rotor 231 (which can be referred to as a rotor assembly 231). Rotor 231 includes a threshing section 234 and a separating section 235. Separating section 235 can be formed continuous with, or, alternatively, coupled with, threshing section 234. Further, separating section 235 is positioned downstream (aft) of threshing section 234 in the flow direction, as is known in the art. Rotor 231 further includes a tube mechanism 236. In this embodiment of the present invention, tube mechanism 236 provides a skin of rotor 231; as is known, a structural tube can extend through tube 236 from fore to aft, to which tube 236 can be coupled and thereby mounted. Tube mechanism 236 can be continuous from a forward end of rotor 231 to a rearward end of rotor 231, or, alternatively, can be an assembly formed of a plurality of parts. For instance, tube mechanism 236 (which can be referred to as tube 236) can be deemed to be an assembly which includes a first portion 237 and a second portion 238 coupled with the first portion 237 (for instance, rotor 231 can be made of a metal such as steel, such that portions 237, 238 are welded together). First portion 237 includes a first diameter 239 (which can be a conventional diameter) and is associated with threshing section 234, and second portion 239 includes a second diameter 249 and is associated with separating section 235. As shown in FIG. 2, first diameter 239 is substantially equal to second diameter 249. Further, threshing section 234 includes a plurality of rasp bars 255, as is known in the art.

Figure 6:
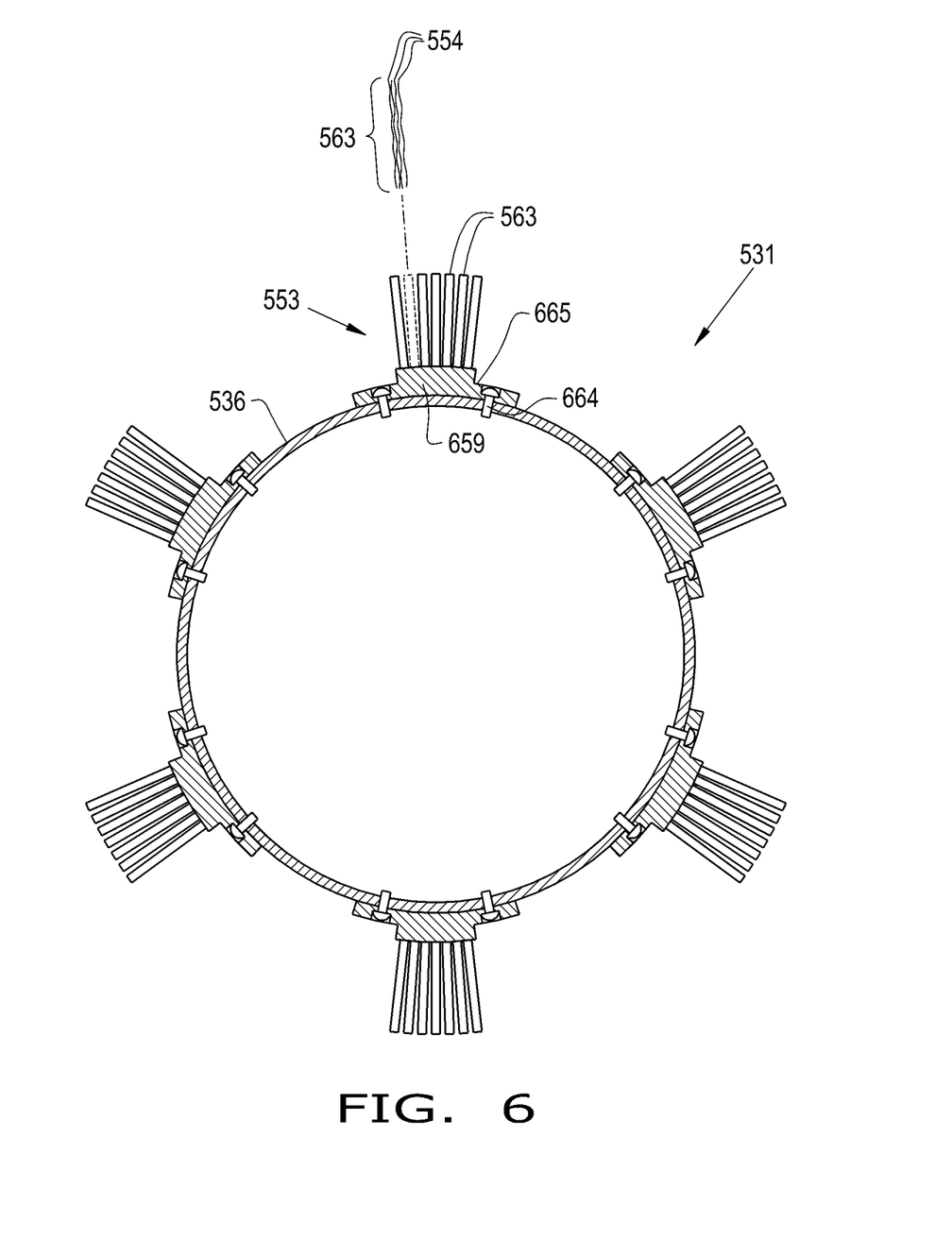
FIG. 6 illustrates a cross-sectional view taken along line 6-6 in FIG. 5, with portions broken away, with the brush device shown in Detail A in FIG. 5 being at the top dead center in FIG. 6, in accordance with an exemplary embodiment of the present invention.

Further, rotor 231 includes at least one brush device 253 mounted to an external surface of tube 236. FIG. 2 can be understood to show three such brush devices 253 (each of which can be referred to as a brush 253) which extend longitudinally on the external surface and are spaced apart circumferentially from one another. FIG. 2 shows brushes 253 positioned only within separating section 235, threshing section 234 thus having an absence of any brush 253; nevertheless, it can be appreciated that brushes 253 can be positioned within threshing section 234, in addition to or in the alternative to separating section 235. Brush device 253 can be mounted to tube 236 in any suitable manner, including any of the ways discussed herein. As discussed below, each brush device 253 includes a mount (not shown in FIG. 2, but which can also be referred to as a casing, such as mount 659 in FIG. 6) which holds partially therein a plurality of flexible fingers 254 (which can also be referred to as bristles, tines, strands (like hair strands), filaments, or spokes), such that each finger 254 is attached to the mount on one end of finger 254 and is free at an opposing end of finger 254 (substantially similar fingers 554 are shown in FIG. 6 as part of a plug 563 of brush device 553). Thus, each brush 253 includes a mount which holds the plurality of fingers 254, the mount being fastened to tube mechanism 236 such that each brush 254 is coupled with second portion 238, for example, of tube 236.

A single brush 253 shown in FIG. 2 can be understood to extend from a forward end of separating section 235 to a rearward end of separating section 235 along a substantially straight line. However, it can be appreciated that, rather than a single brush extending this full length of separating section 235, a plurality of brushes 253 can be placed end-to-end so as to extend this full length (alternatively, rather than being placed end-to-end, such brushes 253 can be spaced apart from one another in axial (longitudinal) direction in a substantially straight line). Though only three such brushes 253 are shown in FIG. 2, it can be appreciated that a fourth brush 253 can be placed on the bottom of rotor 231, which is not visible in FIG. 2 (such that brushes 253 are placed at the 12, 3, 6, and 9 o'clock positions along rotor 231, according to one embodiment). It can also be appreciated that rotor 231 can include more or less than four such brushes 253, which can be located at different positions on tube 236 than what is shown in FIG. 2. FIG. 2, thus, shows brushes 253 disposed in a predetermined pattern on tube 236. It can be further appreciated that brushes 253 can be disposed on tube 236 in any number of other patterns, some of which are discussed below. Fingers 254 can be made of any suitable material, such as a polymer such as a plastic, a metal such as steel, or a composite material. Fingers 254 are configured to engage the crop material as rotor 231 rotates during operation of combine 100, so as to separate grain from MOG. Because the crop material encounters fingers 254 of brushes 253 in separating section 235, rather than rasp bars in separating section 235 like those in threshing section (rasp bars 255), a gentler separating action will occur, thereby better preserving the size and length of the MOG.

According to an alternative embodiment of the present invention, not only can a plurality of brush devices be included in the separating section on the tube, but so can a plurality of rasp bars, unlike the embodiment shown in FIG. 2. Further, rather than having brush devices that extend longitudinally the distance of the separating section, the brush devices can be substantially shorter in terms of their longitudinal extent across the surface of the tube. According to one embodiment of the present invention, these brush devices can be spaced apart from one another longitudinally and circumferentially and can be understood to be spaced apart from one another along a diagonal or helical path on the tube. Similarly, the rasp bars can be spaced apart from one another, and from the brush devices, longitudinally and circumferentially, and can be understood to be spaced apart from one another along a diagonal or helical path on the tube. the brush devices, can be spaced apart from one another. This combination of brushes devices and rasp bars in the separating section can provide a gentler separating action, as opposed to if the rasp bars alone were use in place of the brush devices.

According to an alternative embodiment of the present invention, brush devices can be employed in the threshing section as well. Considering FIG. 2 again, though not labeled as such, the threshing section 234 shown in FIG. 2 can be deleted, such that separation section 235 shown in FIG. 2 forms the entirety of rotor 231, but the separation section 235 shown in FIG. 2 would now include both a threshing section (disposed at the forward portion of the separation section 235 shown in FIG. 2) and a separation section (disposed at the rearward portion of the separation section 235 shown in FIG. 2). In this way, the brush devices 253 are disposed in both the threshing and separation sections of the rotor.

Figure 3:
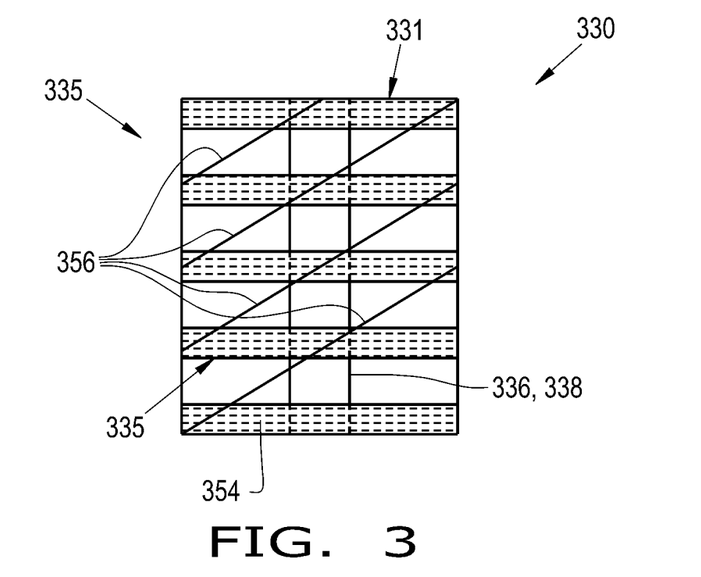
FIG. 3 illustrates a top view of the threshing and separating system of the agricultural harvester of FIG. 1, with portions broken away, the threshing and separating system including another exemplary embodiment of the rotor, in accordance with another exemplary embodiment of the present invention.

Referring now to FIG. 3, there is shown a top view of another embodiment of the threshing and separating system 130 of FIG. 1, with portions broken away, according to an exemplary embodiment of the present invention. All prior reference numbers with respect to threshing and separating system 130 are increased by a multiple of 100 and are substantially similar to the structures and function of the embodiments shown in FIGS. 1-2, unless otherwise shown and/or described. Thus, threshing and separating system 130 is labeled as 330 in FIG. 3. Rotor 331 includes a threshing section and a separating section 335, though only separating section 335 is shown in FIG. 3. Rotor 331 further includes tube 336 extending axially, more specifically, second portion 338 of tube 336. Unlike in FIG. 1, second portion 338 (which is associated with separating section 335) has a reduced diameter as compared to the diameter of the first portion (not shown in FIG. 3) of tube 336. In this vein, second portion 338 can, optionally, be formed by the structural tube that extends from fore to aft of rotor 331 (and thus be the same structure as the structural tube), or, alternatively, can be formed by a cylinder that is larger in diameter relative to the diameter of the structural tube but less in diameter relative to the diameter of the first portion of tube 336. In this latter alternative, the second portion can be coupled to the structural tube in any suitable manner, such as by way of spokes, webs, or the like. Further, the latter alternative is assumed in this embodiment of the present invention, as well as in all embodiments that follow, unless otherwise stated.

Mounted to the external surface of tube 336 (only within separating section 335) are a plurality of brush devices 353 (each of which has a plurality of fingers 354). A single brush device 353, or a plurality of brush devices 353 in end-to-end fashion, can be mounted to tube 336 so as to extend circumferentially all the way around tube 336, thereby forming a brush ring about tube 336. Brush device(s) 353 can be mounted to tube 336 in any suitable manner, including any of the ways discussed herein. A plurality of such brush rings are shown in FIG. 3 to be spaced apart longitudinally along tube 336; a similar brush pattern is known outside of the agricultural industry. FIG. 3 shows that rotor 331 can further include a plurality of vanes 356, which are configured for pushing and thereby moving the crop material, such as MOG, axially along rotor 331 as rotor 331 rotates. Vanes 356 (which can be referred to as cage vanes 356) can be coupled with the external surface of tube 336 and can be disposed diagonally or helically about tube 336. Further, as shown in FIG. 3, each vane 356 can span three brush rings axially. With this embodiment, a clearance (between brushes 353 and vanes 356) can be closer, with the possibility of moving the crop material better, with less power consumption and less damage to the crop material.

Further, by employing brushes in the separating section 335, a reduced diameter size of the rotor 331 can be employed from fore to aft of rotor 331. For example, the threshing section of rotor 331 can have a 30 inch diameter, whereas the separating section 335 can have a 24 inch diameter. These dimensions can be employed in all embodiments of the present invention having a stepped down configuration, but are provided by way of example and not limitation.

Figure 4:
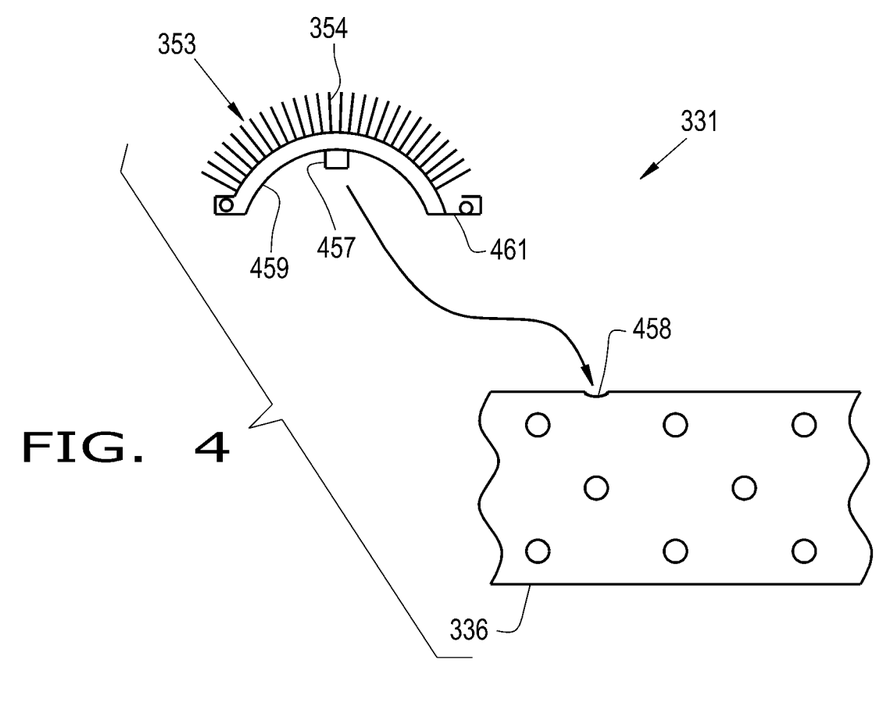
FIG. 4 illustrates a partially exploded, composite view of a portion of the rotor of FIG. 3, with portions broken away, the rotor including a tube and a brush device, a side view of the tube and an end view of the brush device being shown in FIG. 4, according to an exemplary embodiment of the present invention.

Referring now to FIG. 4, a composite view of rotor 331, with portions broken away, rotor 331 including tube 336 and brush device 353 of FIG. 4, such that brush device 353 is exploded from tube 336, and a side view of tube 336 is shown, and an end view of brush device 353 is shown in FIG. 4. More specifically, brush device 353 is exploded from tube 336 and rotated about a vertical axis ninety degrees, for illustrative purposes; thus, the end view refers to looking from a left or right end of tube 336 in FIG. 4 if brush 353 were mounted to tube 336 in a circumferential manner. Each brush ring of FIG. 3 is shown here, according to one embodiment of the brush ring, to include two hemispherical sections (each of which is a brush device 353, which can also be referred to as brush 353), one such hemispherical section being shown in FIG. 4. Each hemispherical section of the brush ring mounts onto the external surface of tube 336 in a circumferential direction; thus, to mount the hemispherical section of brush 353 shown in FIG. 4 to tube 336, this hemispherical section would be turned ninety degrees and positioned on tube 336 in a circumferential manner, so that the hemispherical section wraps around tube 336 circumferentially. Brush device 353 (formed as a hemispherical section in FIG. 4) is shown to include in FIG. 4, according to one exemplary embodiment, a mount 459, fingers 354 attached to mount 459, an index pin 457, and two feet 461 (on opposing sides of brush device 353). When mounting the hemispherical section to tube 336, index pin 457 seats within a respective one of the well-placed holes 458 (a plurality of which are shown in FIG. 4) formed in tube 336 (each brush 353 can include more than one such pin 458). Further, feet 461 are configured to abut corresponding feet 461 of an opposing hemispherical section when two such hemispherical sections are mounted to tube 336. Each foot 461 can include a substantially flat section that abuts the flat section of an opposing foot 461 and can be formed to flex. Further, each foot 461 can include any suitable way for coupling the opposing feet of opposing hemispherical sections together, such as holes in the flat sections in which to receive any suitable fastener, such as a screw, a bolt, and/or any suitable tie mechanism. Further, though not shown, the external surface of tube 336 can include a groove which can receive at least a portion of mount 459; mount 459 can seat within such groove and can optionally be further affixed to tube 336 by being fastened to the groove, such as by way of a bolt. In this way, the brush ring hemispherical sections 353 can clamp to tube 336, according to one exemplary embodiment.

Further, though not specifically discussed herein with reference to any of the other embodiments of the present invention, any of the brush devices can include a similar index pin for mating with a hole in the tube, and can also include feet with abut and attach to opposing feet of an adjacent brush device. Further, in the other embodiments of the brush device, a similar mount can be used as that shown in FIG. 4, except that the mount can be straight, rather than curved, or can be curved to a different degree, or even twisted as necessary, in order to achieve the desired mounting pattern on the corresponding tube. This sort of bending can occur during manufacturing of the brush devices, or can, optionally, be made such that an assembler of the brush devices to the tube can perform the bending, depending upon the desired mounting pattern to be achieved on the tube.

Figure 5:
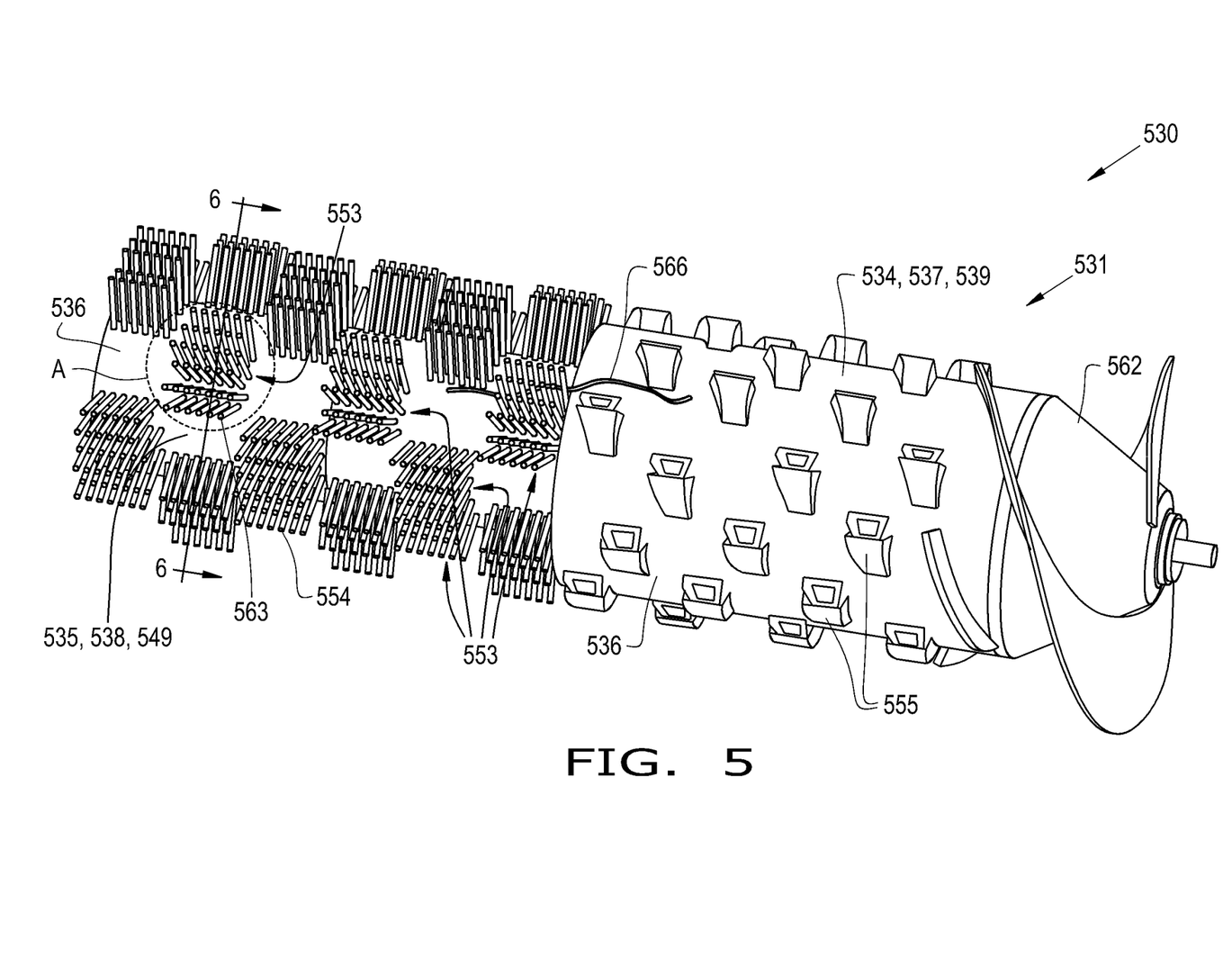
FIG. 5 illustrates a perspective view of the threshing and separating system of the agricultural harvester of FIG. 1, with portions broken away, the threshing and separating system including another exemplary embodiment of the rotor, in accordance with another exemplary embodiment of the present invention.

Referring now to FIG. 5, there is shown a perspective view of another embodiment of the threshing and separating system 130 of FIG. 1, with portions broken away, according to an exemplary embodiment of the present invention. All prior reference numbers with respect to threshing and separating system 130 are increased by a multiple of 100 and are substantially similar to the structures and function of the embodiments shown in FIGS. 1-2, unless otherwise shown and/or described. Thus, threshing and separating system 130 is labeled as 530 in FIG. 5. Rotor 331 includes a threshing section 534, a separating section 535, and a conical infeed 562 at the upstream end of rotor 331 and leading to threshing section 534, as shown in FIG. 5. Rotor 531 further includes tube 536, which includes first portion 537 associated with threshing section 534 and second portion 538 associated with separating section 535. First portion 537 has first diameter 539, and second portion 538 has second diameter 549. First diameter 539 is greater than second diameter 549, such that tube 536 has a stepped configuration. First portion 537 and second portion 538 may be coupled with each other in any suitable manner, such as by way of an annular section spanning the distance between first and second portions 537, 538, and first and second portions 537, 538 can each be attached to an outer diameter and an inner diameter of this annular section, respectively, in any suitable manner, such as by way of welding (the annular section optionally being of the same material as first and second portions 537, 538, such as a metal, such as steel).

Rotor 531 includes both rasp bars 555 and brush devices 553. Mounted to the external surface of tube 536 within threshing section 534 are a plurality rasp bars 555, in any suitable pattern. Conversely, threshing section 534 lacks any brush devices. Further, mounted to the external surface of tube 536 in separating section 535 are a plurality of brush devices 553 (each of which has a plurality of fingers 554). Conversely, separating section 535 lacks any rasp bars. Though not shown in FIG. 5, each brush device 553 can include a mount for holding fingers 554 and for mounting brush devices 553 to tube 536. Brush devices 553 can be mounted to tube 536 in any suitable manner, including any of the ways discussed herein, one such way being shown with respect to FIG. 6, which shows the mount (mount 659) used to hold the collection of fingers 554. The collection of fingers 554 in Detail A is deemed to be a single brush device 553 in FIG. 5. Thus, each brush device 553 in FIG. 5 is disposed in six longitudinally extending rows spaced apart circumferentially, when viewed from the rearward end of rotor 531. Each longitudinal row can include, as shown in FIG. 5, six plugs 563 of fingers 554. Each plug 563 can be a single finger 554, or, alternatively, can include a plurality of fingers 554 (such that a plug 563 is a smaller collection of fingers 554); for the sake of discussion, each plug 563 herein is deemed to include a plurality of fingers 554. These numbers of rows and plugs are provided by way of example and not limitation, and more or less of each may be included in a single brush device. Brush devices 553, in FIG. 5, are spaced apart from one another longitudinally and circumferentially and can be understood to be spaced apart from one another along a diagonal or helical path as well, in accordance with a predetermined pattern. Further, FIG. 5 shows rasp bars 555 and fingers 554 of brush devices 553 engaging crop material 566 (which serves as a representative example for all embodiments of the present invention).

Referring now to FIG. 6, there is shown a cross-sectional view taken along line 6-6 in FIG. 5, with portions broken away, with brush device 553 in Detail A in FIG. 5 being at top dead center (the 12 o'clock position) in FIG. 6. FIG. 6 shows one optional way of mounting the brush device to the tube, in accordance with an exemplary embodiment of the present invention. Rotor 531 is shown in FIG. 6 to include tube 536 and a plurality of brush devices 553 mounted to an external surface of tube 536. Focusing on brush device 553 at the 12 o'clock position, brush device 553 includes mount 659 and plugs 563 of fingers 554 attached to mount 659. Six longitudinal rows of plugs 563 are shown in FIG. 6. For illustrative purposes, one plug 563 taken from the brush device 553 at the 12 o'clock position in FIG. 6 is exploded from its position in mount 659, so as to illustrate fingers 554 of one of the plug 563. Mount 659 can be formed of any suitable material, such as a polymer, such as a wear-resistant plastic, and can be formed using any suitable manufacturing method, such as a molding procedure, such as injection molding. The wear-resistant plastic can serve to minimize cost, and, if failure occurs with respect to mount 659, then brush 553 can minimize damage to combine 100. Mount 659 can thus be a molded block. Fingers 554 can be in-molded to mount 659. Mount 659 can include a recess 665 on each side, which can be a protective recess for hardware. The shape or geometry of mount 659 can be configured for minimizing wear. Each transverse portion of mount 659 can include at least one hole for receiving a fastener 654, such as a screw, bolt, or rivnut, or the like. Further, tube 536 can include holes for receiving a respective fastener 654 in order to mount brush device 553 to tube 536. The holes in tube 536 for receiving fastener 654 can be laser cut in a rotor skin blank, such laser cutting being able to provide good placement of a pattern in tube 536. Further, fasteners 654 formed as rivnuts can be closed M10 or M12 rivnuts, so that no material or moisture can get into the interior of tube 536. Thus, mount 659 is fastened to tube 536, such that each brush device 553 is coupled with second portion 538 of tube 536. Further, tube 536 can include an access through-hole positioned circumferentially between the holes which receive fasteners 654. This access hole can provide hand clearance under mount 659 for cleaning of the interior of tube 536 (i.e., accessing the interior of tube 536 when brush device 553 is not mounted to tube 536), for servicing, and/or for removing a failed fastener 654 with mount 659 acting as a cover or seal.

According to an alternative way of mounting a brush device according to the present invention, the brush device can include a mount formed as a casing, which can be made of any suitable material, such as a metal (such as steel), or a polymer. The casing holds the plugs and/or fingers, in any suitable manner. Below the brush material, the casing can include a retainer mechanism, such as a retainer through-hole. The casing can have a transverse cross-section (in the circumferential direction of the rotor) that is substantially rectangular, with a short wall of the rectangle facing the external surface of the tube, and both long walls of the rectangle being upstanding relative to the external surface of the tube. Mounted to the tube of the separating section can be two opposing brackets which hold the casing to the tube. Each bracket can have substantially an L-shape, with a base leg of the L-shaped bracket being positioned against the external surface of the tube, and the upstanding leg of the L-shaped bracket being positioned against a long wall side of the casing (that is, against a respective long wall of the rectangular cross-section of the casing). These L-shaped brackets are positioned opposite one another, with the casing positioned therebetween. The base leg of each L-shaped bracket can include a hole, which can be lined up with a hole in the tube, and a fastener (such as a screw, bolt, rivet, rivnut, or the like) can be used to affix each base leg to the tube. Further, each upstanding leg of the L-shaped bracket can have a hole. After attaching the base legs to the tube, the casing can be positioned between the upstanding legs, and the retainer through-hole of the casing can be lined up with each hole of the upstanding legs, and a fastener can be used to fasten the upstanding legs to the casing. For example, a bolt can extend transversely through each of these holes (the retainer through-hole of the casing, and the holes of upstanding legs), and the bolt and a corresponding nut can be tightened so as to secure the casing to the L-shaped brackets. This is but one option for attaching the casing to the brackets, and other ways are within the scope of the present invention. Further, each casing can include a plurality of retainer through-holes, and a plurality of corresponding pairs of L-shaped brackets can be used to couple the brush device to the tube. This alternative way of mounting a brush to a substrate (not to a rotor of a combine) is known in the street sweeper industry.

Figure 7:
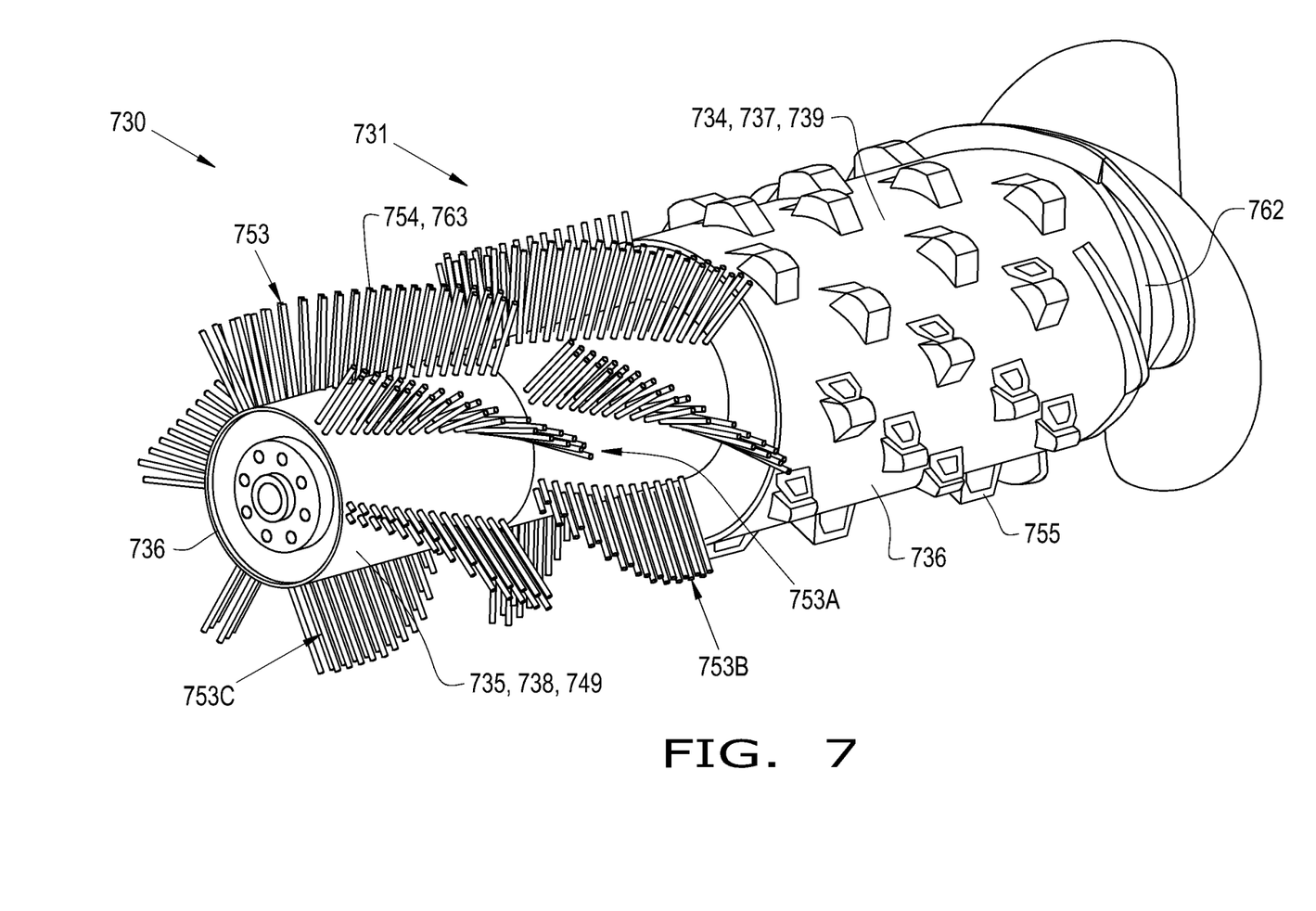
FIG. 7 illustrates a perspective view of the threshing and separating system of the agricultural harvester of FIG. 1, with portions broken away, the threshing and separating system including another exemplary embodiment of the rotor, in accordance with another exemplary embodiment of the present invention.

Referring now to FIG. 7, there is shown a perspective view of another embodiment of the threshing and separating system 130 of FIG. 1, with portions broken away, according to an exemplary embodiment of the present invention. All prior reference numbers with respect to threshing and separating system 130 are increased by a multiple of 100 and are substantially similar to the structures and function of the embodiments shown in FIGS. 1-2 and 5-6, unless otherwise shown and/or described. Thus, threshing and separating system 130 is labeled as 730 in FIG. 7. Rotor 731 includes a threshing section 734, a separating section 735, and a conical infeed 762. Rotor 731 further includes tube 736, which includes first portion 737 associated with threshing section 734 and second portion 738 associated with separating section 735. First portion 737 has first diameter 739, and second portion 738 has second diameter 749. First diameter 739 is greater than second diameter 749, such that tube 736 has a stepped configuration. First portion 537 and second portion 538 may be coupled with each other in any suitable manner, such as by way of an annular section spanning the distance between first and second portions 537, 538, as described above with respect to FIG. 5, this annular section being visible in FIG. 7.

Rotor 731 includes both rasp bars 755 and brush devices 753, with rasp bars 755 being only in threshing section 734, and brush devices 753 being only in separating section 735, each of rasp bars 755 and brush devices 753 being mounted in any suitable pattern. Brush devices 753 can include plugs 763 and fingers 754 (here, for the sake of discussion, plugs 763 include a plurality of fingers 754). Each brush device 753 can be mounted to tube 736 in any suitable manner, including any of the ways discussed herein; for the sake of discussion, each brush device 753 is mounted to tube 736 in a way that is similar to what is discussed and shown with respect to FIGS. 5-6, unless stated otherwise. Thus, each brush device 753 can include a mount (not shown in FIG. 7) which holds plugs 763 and fingers 754, such that each brush device 753 has a respective number of plugs 763 in a predetermined configuration so as to form a respect brush device 753. Each brush device 753 can then be mounted to tube 736 in any suitable predetermined pattern. FIG. 7 shows each brush device 753 (brush devices 753 are shown to include brush devices 753A, 753B, 753C) including two longitudinally extending rows of plugs 763 of finger 754, each row mounted diagonally or helically. For instance, brush device 753A includes two rows extending longitudinally and in a diagonal or helical pattern, each row including several plugs 763. Further, brush device 753A is shown to have plugs 763 of a substantial similar height to one another. By contrast, brush device 753B has plugs 763 of a different height relative to one another, the taller plugs 763 being closer to threshing section 734, such that the heights of these plugs 763 form a curved slope (sloping down moving aft). Brush device 753C has a sloping configuration in terms of the height of plugs 763 as well, but the taller plugs 763 are disposed away from threshing section 734 (sloping up moving aft). Though the respective slope of brushes 753B and 753C are curved, the slope can be any configuration, i.e., straight, or undulating (up, down, up, down). Thus, the predetermined pattern for the brush devices 753 (the brush pattern) mounted to tube 736 in FIG. 7 is varied. However, according to other embodiments of the present invention, the brush pattern need not be varied. For example, all the brush devices on the tube may be substantially similar to brush device 753A, or a brush device having a different configuration.

Though not shown, other brush patterns can be employed, and the scope of the present invention is not limited to what is described or shown herein.

Thus, according to another embodiment of a brush pattern on the rotor, the brush pattern includes the brush devices (brushes) being attached to the tube in a spiral or helical pattern. That is, a single brush can spiral around the tube the entire longitudinal distance of the separating section so as to form a brush line, or a plurality of brushes can be joined end-to-end to traverse this distance, so as to form a spiral (the brush line can travel the entire circumference of the tube any number of times). This brush pattern forms a pattern similar to an auger. Vanes can optionally be included as well.

According to another embodiment of a brush pattern on the rotor, the brush pattern can include a plurality of spiral or helical brush lines. For instance, the forward longitudinal half of the separating section can include two such brush lines spaced apart circumferentially, and the rearward longitudinal can also include two such brush lines spaced apart circumferentially. A similar brush pattern is known outside of the agricultural industry.

According to yet another embodiment of a brush pattern on the rotor, the separating section can include a brush ring (as described above) near the threshing section. Moving farther away from the threshing section, one or more brushes can form a brush line, which can again form a spiral or helical pattern about tube. But, when viewed from the side of the rotor, the brush line can form a single cycle of a sine wave (one peak on top of the tube and one peak on bottom of the tube), the sine wave terminating at the aft end of the separating section. Another brush line can also be included, spanning the same longitudinal distance, and forming a single sine wave, but inverted relative to the first described sine wave.

According to yet another embodiment of a brush pattern on the rotor, the brushes can form longitudinally extending brush lines that are disposed diagonally at a relatively small angle running from start to finish. For example, the start of the particular brush line (starting near the threshing section) can at zero degrees on the tube (that is, top dead center). The end of that particular brush line (finishing at the aft end of the tube) can be at ninety degrees, such that the brush line is displaced only ninety degrees in total from start to finish. A similar brush pattern is known outside of the agricultural industry.

According to yet another embodiment of a brush pattern on the rotor, the separating section can be substantially filled with brush devices, longitudinally and circumferentially. The heights of the fingers can be substantially similar. A similar brush pattern is known outside of the agricultural industry.

According to yet another embodiment of a brush pattern on the rotor, the separating section can be substantially filled with brush devices, longitudinally and circumferentially. However, the fingers of the brushes are not all the same height. Optionally, the shorter fingers, for instance, can form a predetermined pattern extending longitudinally in the separating section, such as straight longitudinally extending channels, spiral or helical channels, chevron-shaped channels, channels which zig-zag (like repeating the letter "w"). Further, the channels can optionally have varying depth (that is, some of the shorter fingers are shorter than others). Further, such brush patterns can be employed, wherein the shorter fingers are omitted altogether, yet leaving a similar pattern. Similar brush patterns (aside from channels or the lack thereof) are known outside the agricultural industry.

In use, rotor 131 of threshing and separating section 130 can be assembled to include brush devices, in place of some or all of rasp bars. The material of the fingers of the brush devices can be selected depending upon, for example, the type of crop and the harvesting conditions. For instance, the material of the fingers and the brush patterns can be provided to provide a more or less aggressive threshing and/or separating. For eatable beans, for example, the whole rotor 131 can employ as brush design, as such crop material threshes easily, or a combination of rasps and brushes can be employed. On the other hand, it may be determined that brush devices should be employed only in the separation section of rotor 131. After assembling the brush devices according to the desired predetermined pattern, the rotor 131 of the threshing and separating system 130 of the combine is ready for harvesting the crop material. As the crop material moves from over the conical infeed and is pushed by the impeller associated with the conical infeed into the threshing section of rotor 131. After the threshing section, the crop material proceeds to the separating section of rotor 131, where the crop material encounter the brush devices of the present invention, rather than rasp/separator bars (or, at least a combination of rasp/separator bars and brush devices). Because the fingers of the brush devices are of a softer material than rasp/separator bars and thus have some flex and give and have a different surface, the MOG is less likely to be destroyed. For example, there would be no hard corners. The brush devices of the separating section continues to move the crop material, namely, the MOG, rearward and out of the area of rotor 131 to a discharge system of combine 100.

Figure 8:
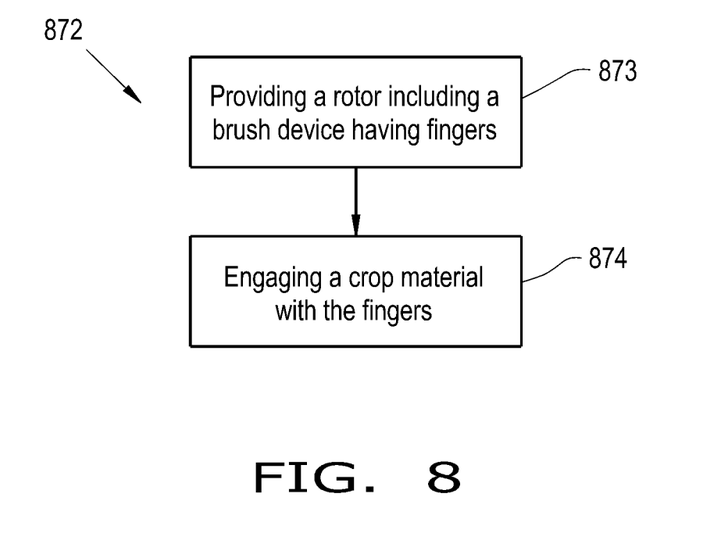
FIG. 8 illustrates a flow diagram showing a method of controllably performing work, in accordance with an exemplary embodiment of the present invention.

Referring now to FIG. 8, there is shown a flow diagram showing a method 872 of using an agricultural harvester 100, the method 872 including the steps of: providing 873 that agricultural harvester 100 includes: a chassis 101; and a threshing and separating system 130, 230, 330, 530, 730 coupled with the chassis 101, the threshing and separating system 130, 230, 330, 530, 730 including a rotor 131, 231, 331, 531, 731 including at least one brush device 253, 353, 553, 753, 753A, 753B, 753C including a plurality of fingers 254, 354, 554, 754 which are flexible; and engaging (874) a crop material 566 by the plurality of fingers 254, 354, 554, 754. The rotor 131, 231, 331, 531, 731 can be an axial rotor 131, 231, 331, 531, 731 which includes a threshing section 234, 534, 734 and a separating section 235, 335, 535, 735 coupled with and positioned downstream of the threshing section 234, 534, 734, at least one of the threshing section 234, 534, 734 and the separating section 235, 335, 535, 735 including the at least one brush device 253, 353, 553, 753, 753A, 753B, 753C. The threshing section 234, 534, 734 can have an absence of the at least one brush device 253, 353, 553, 753, 753A, 753B, 753C, the separating section 235, 335, 535, 735 including a plurality of the brush device 253, 353, 553, 753, 753A, 753B, 753C disposed in a predetermined pattern. The rotor 131, 231, 331, 531, 731 can include a tube mechanism 236, 336, 536, 736 including a first portion 237, 537, 737 and a second portion 238, 338, 538, 738 coupled with the first portion 237, 537, 737, the first portion 237, 537, 737 including a first diameter 239, 539, 739 and being associated with the threshing section 234, 534, 734, the second portion 238, 338, 538, 738 including a second diameter 249, 549, 749 and being associated with the separating section 235, 335, 535, 735, the first diameter 239, 539, 739 being greater than the second diameter 249, 549, 749. Each of the plurality of the brush device 253, 353, 553, 753, 753A, 753B, 753C can include a mount 459, 659 which holds the plurality of fingers 254, 354, 554, 754, the mount 459, 659 being fastened to the tube mechanism 236, 336, 536, 736 such that each of the plurality of the brush device 253, 353, 553, 753, 753A, 753B, 753C is coupled with the second portion 238, 338, 538, 738 of the tube mechanism 236, 336, 536, 736.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A threshing and separating system of an agricultural harvester coupled with a chassis of the agricultural harvester, the threshing and separating system comprising:
 a rotor including (i) at least one brush device including a plurality of fingers which are flexible, the plurality of fingers being configured for engaging a crop material, and (ii) at least one rasp bar for threshing crop material, wherein the rotor is an axial rotor that includes a threshing section and a separating section positioned downstream of the threshing section, the threshing section including the at least one rasp bar extending radially from an outer perimeter of the threshing section, and the separating section including the at least one brush device extending radially from an outer perimeter of the separating section.

2. The threshing and separating system of claim 1, wherein the threshing section has an absence of the at least one brush device, the separating section including a plurality of the brush devices disposed in a predetermined pattern.

3. The threshing and separating system of claim 2, wherein the rotor includes a tube mechanism including a first portion and a second portion coupled with the first portion, the first portion including a first diameter and being associated with the threshing section, the second portion including a second diameter and being associated with the separating section, the first diameter being greater than the second diameter.

4. The threshing and separating system of claim 3, wherein each of the plurality of the brush devices includes a mount which holds the plurality of fingers, the mount being fastened to the tube mechanism such that each of the plurality of the brush devices is coupled with the second portion of the tube mechanism.

5. The threshing and separating system of claim 1, wherein the rotor includes a tube mechanism including a first portion and a second portion coupled with the first portion, the first portion including a first diameter and being associated with the threshing section, the second portion including a second diameter and being associated with the separating section, the first diameter being greater than the second diameter.

6. An agricultural harvester, comprising:
a chassis; and
a threshing and separating system coupled with the chassis, the threshing and separating system including a rotor including (i) at least one brush device including a plurality of fingers which are flexible, the plurality of fingers being configured for engaging a crop material, and (ii) at least one rasp bar for threshing crop material, wherein the rotor is an axial rotor that includes a threshing section and a separating section positioned downstream of the threshing section, the threshing section including the at least one rasp bar extending radially from an outer perimeter of the threshing section, and the separating section including the at least one brush device extending radially from an outer perimeter of the separating section.

7. The agricultural harvester of claim 6, wherein the threshing section has an absence of the at least one brush device, the separating section including a plurality of the brush devices disposed in a predetermined pattern.

8. The agricultural harvester of claim 7, wherein the rotor includes a tube mechanism including a first portion and a second portion coupled with the first portion, the first portion including a first diameter and being associated with the threshing section, the second portion including a second diameter and being associated with the separating section, the first diameter being greater than the second diameter.

9. The agricultural harvester of claim 8, wherein each of the plurality of the brush devices includes a mount which holds the plurality of fingers, the mount being fastened to the tube mechanism such that each of the plurality of the brush devices is coupled with the second portion of the tube mechanism.

10. The agricultural harvester of claim 6, wherein the rotor includes a tube mechanism including a first portion and a second portion coupled with the first portion, the first portion including a first diameter and being associated with the threshing section, the second portion including a second diameter and being associated with the separating section, the first diameter being greater than the second diameter.

11. A method of using an agricultural harvester, the method comprising the steps of:
providing that agricultural harvester includes:
a chassis; and
a threshing and separating system coupled with the chassis, the threshing and separating system including a rotor including (i) at least one brush device including a plurality of fingers which are flexible, and (ii) at least one rasp bar for threshing crop material, wherein the rotor is an axial rotor that includes a threshing section and a separating section positioned downstream of the threshing section, the threshing section including the at least one rasp bar extending radially from an outer perimeter of the threshing section, and the separating section including the at least one brush device extending radially from an outer perimeter of the separating section; and
engaging a crop material by the plurality of fingers.

12. The method of claim 11, wherein the threshing section has an absence of the at least one brush device, the separating section including a plurality of the brush devices disposed in a predetermined pattern.

13. The method of claim 12, wherein the rotor includes a tube mechanism including a first portion and a second portion coupled with the first portion, the first portion including a first diameter and being associated with the threshing section, the second portion including a second diameter and being associated with the separating section, the first diameter being greater than the second diameter.

14. The method of claim 13, wherein each of the plurality of the brush devices includes a mount which holds the plurality of fingers, the mount being fastened to the tube mechanism such that each of the plurality of the brush devices is coupled with the second portion of the tube mechanism.

15. The method of claim 11, wherein the rotor includes a tube mechanism including a first portion and a second portion coupled with the first portion, the first portion including a first diameter and being associated with the threshing section, the second portion including a second diameter and being associated with the separating section, the first diameter being greater than the second diameter.

* * * * *